April 3, 1956     E. PERCHONOK     2,740,295
TEMPERATURE RATIO MEASUREMENT MEANS
Filed Feb. 7, 1951     2 Sheets-Sheet 1
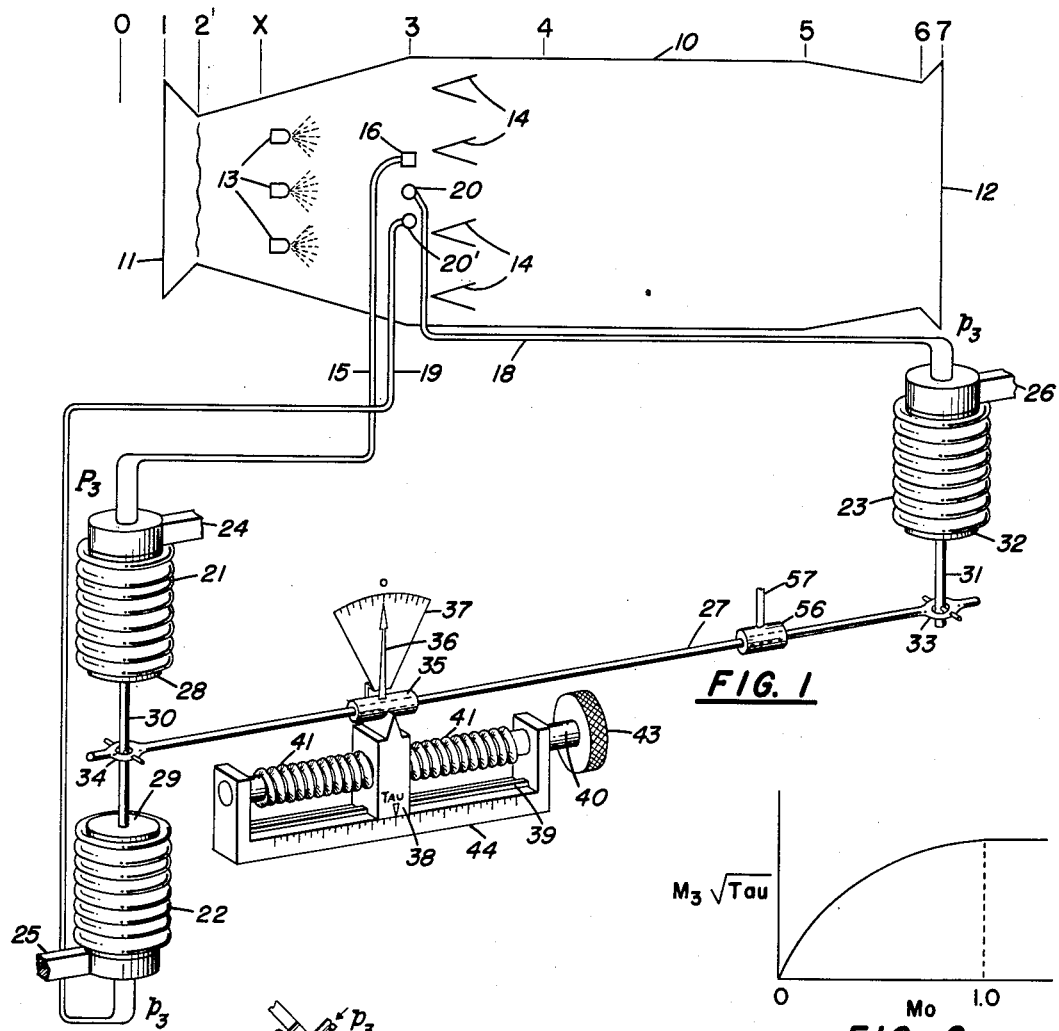
FIG. 1
FIG. 2
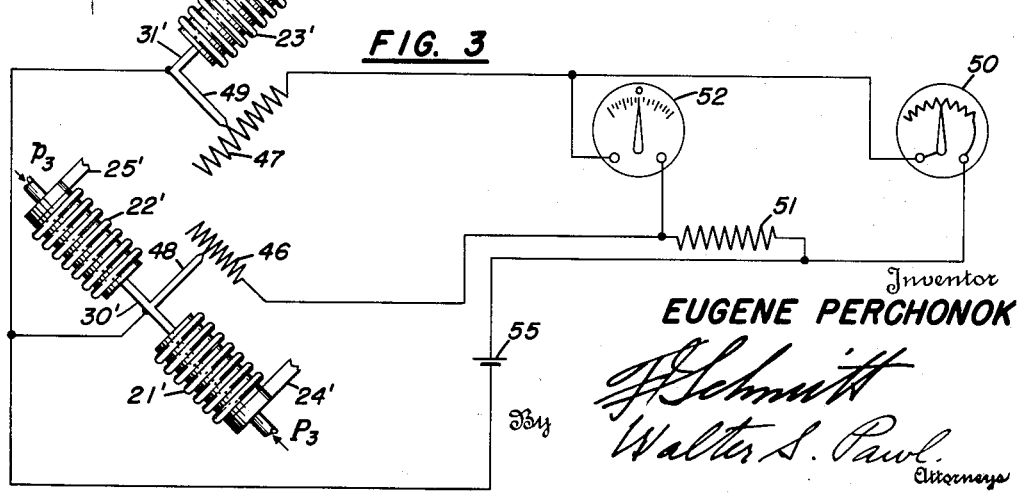
FIG. 3
Inventor
EUGENE PERCHONOK Inventor
EUGENE PERCHONOK

United States Patent Office 2,740,295
Patented Apr. 3, 1956

2,740,295

TEMPERATURE RATIO MEASUREMENT MEANS

Eugene Perchonok, Cleveland, Ohio

Application February 7, 1951, Serial No. 209,893

4 Claims. (Cl. 73—357)

(Granted under Title 35, U. S. Code (1952), sec. 266)

This invention relates to apparatus useful in obtaining efficient operation and automatic control over ram jet engines and turbojet afterburners and in which exhaust gas temperature and the temperature ratio across the engine are determined without direct measurement of the high exhaust gas temperatures involved.

More particularly the invention is directed to apparatus by which the total temperature ratio is found by pressure responsive mechanism connected to the jet engine at predetermined selected points in such a manner that their collective response is indicated on a scale or in such a manner that it may be used for control of fuel metering or engine performance in flight.

The high temperature exhaust gas temperature reading may be applied to fuel metering, diffuser shock positioning and engine performance controls permitting pre-setting or variation while in flight.

Prior to the present invention numerous methods have been employed in determining ram jet and turbo jet afterburner exhaust gas temperatures, but those temperature determining methods which are applicable to high velocity, high temperature gas measurement cannot readily be used in flight. These prior methods and some of their disadvantages or differences include the following:

Calculation of the exhaust gas temperature from measured values of engine thrust and air flow. This requires a knowledge of the value of the jet thrust and engine air flow for each operating point. These values are not always available and in addition require a lengthy calculation.

Thermocouple readings are not satisfactory because thermocouples do not stand up under extremely high temperature and gas velocities. Moreover radiation and dynamic pressure errors are introduced.

Metal plugs or paints which are sensitive to certain narrow temperature ranges. This method is limited to determining if a given temperature or temperature range has been exceeded and the results can be determined only after the engine has been shut down.

The sodium D-line reversal method is a laboratory technique and has not yet proven practical in flight. It requires the injection of sodium into the flame and gives static instead of total temperature.

Calculation from total pressure drop measurement across the combustion chamber is unsatisfactory, because total pressures are difficult to measure in a high temperature gas stream at velocities which reach supersonic values.

The high temperature measuring system for exhaust gases, said to be developed by the Fairchild Camera and Instrument Corporation, assumes that the gas sample upon which measurement is made is representative of the entire exhaust gas stream. In addition, the effect on the gas sample of cooling the first orifice, which cooling is required above approximately 2000° F., is undetermined.

As distinguished from these prior methods, I have shown theoretically and also have experimentally verified the following pressure temperature relation for a constant area ram jet combustion chamber and a turbojet afterburner. It will be noted that the subscripts of the equation are as shown for the stations in Fig. 1, and that X is a convenient station between stations 2 and 3. The relation may be expressed thus:

$$\frac{p_3 - p_5}{P_x - p_x} = K \frac{T_5}{T_x} + C$$

In the equation $p$ represents static pressure, $P$ represents total pressure and $T$, total temperature. The constants $C$ and $K$ are peculiar to actual engine configuration and the expression $$\frac{T_5}{T_x}$$

represents the total temperature ratio across the combustion chamber. I have found that the relation expressed by the above equation provides a means for indirectly determining the total temperature ratio across the engine $$\frac{T_7}{T_0}$$

sometimes herein to be referred to by the Greek letter Tau. $P_x$, $p_x$, $p_3$, and $p_5$ are easily measurable quantities, and since the compression process is adiabatic $$T_0 = T_1 = T_x$$

Also, since the length of the nozzle 5—7 is small compared to the combustion chamber length 4—5, it can be assumed with little error that $T_5 \approx T_6 \approx T_7$. Because $T_x$ is also an easily measured quantity, the actual value of $T_5$, and consequently $T_7$, can be readily evaluated. The value of $T_7$ is usually too great for simple direct measurement but as will be seen it can be obtained by indirect means. Only fixed combustion-chamber geometry and configuration are required and variation in exit nozzle area both at the throat 6 and at the outlet 7 is tolerable. There is no discontinuity in this relation at choking at the exit nozzle, and the relation is independent of actual values of altitude, air speed, fuel-air ratio and combustion efficiency. It will be seen from the static pressure drop relationship, as expressed in the equation, that I have avoided taking temperature or total pressure measurements in a high-temperature, high-velocity gas stream.

I have also found that a similar relation between Tau and the static pressure drop may also result in a non-uniform area combustion chamber.

It has been analytically demonstrated some time ago for heat addition to a constant area duct, if frictionless flow is assumed, that the temperature ratio across the duct is related to the entering Mach number and the static pressure drop across the duct. I have shown analytically and experimentally with data obtained with a 20-inch and a 16-inch ram jet that the friction of the burner can be accounted for and the theory modified to include this effect.

An alternate method of determining Tau, the Mach number method, differs from the static pressure drop method in that the Mach number method uses only a measure of the combustion chamber inlet dynamic and static pressures. Both methods provide an indirect way of determining the high temperatures involved without actual measurement of the temperature. This is accomplished by use of total and static pressures selected in accordance with my discovery.

I have shown both analytically and experimentally that a variation represented by the curve of Fig. 2 is obtained in a ram jet engine. This may be expressed as $$M_3 \sqrt{\text{Tau}} = \text{function of } M_0.$$

However, above $M_0 \cong 1$, the expression may be simplified to $$M_3\sqrt{\frac{T_7}{T_0}} = \text{constant}$$

In the range of combustion chamber inlet Mach numbers i. e. $M_3$, involved, $M_3$ is approximately equal to $$K\sqrt{\frac{P_3 - p_3}{p_3}}$$

or to $$K'\sqrt{\frac{P_x - p_x}{p_x}}$$

where K and K' are constants.

It will be noted that here too all values except $T_7$ are easily measurable quantities. The curve of Fig. 2 is different for each engine configuration and can be determined either experimentally or analytically.

Once this variation is known, Tau can be determined at subsonic airspeeds by measuring $P_x$, $p_x$ (or $P_3$, $p_3$) and $M_0$. At supersonic speeds Tau can be determined by measuring only $P_x$ and $p_x$ or $P_3$ and $p_3$. It is to be understood that $x$ is a convenient station in the subsonic portion of the inlet diffuser. In either case the exhaust gas temperature can be determined merely from the additional measurement of $T_x$. This method of evaluation does not require a knowledge of altitude at which the engine is operating nor does it require at supersonic velocities a knowledge of the airspeed.

An object of the invention is to provide apparatus for measuring the total temperature ratio across ram jet engines and turbojet afterburners not dependent on a knowledge of the high temperatures involved, said total temperature ratio being a basic ram jet and turbojet afterburner performance parameter.

Another object is to provide apparatus useful in evaluating the exhaust gas total temperature of said devices without direct measurement.

Another object is to provide a means useful in the determination of the total temperature ratio and the exhaust gas total temperature while the engine is running and without a lengthy computation being required.

Another object is to provide an apparatus for determining the total temperature ratio of ram jets at supersonic or subsonic velocities which is independent of air speed, altitude and fuel-air ratio.

Another object is to provide an apparatus in which wall orifices may be used to measure the static pressures of the hot exhaust gas and without requiring a probe located in the hot gas stream of a ram-jet or turbojet after-burner.

Another object is to provide an apparatus combination of the type described which is applicable to any air speed, altitude, and fuel-air ratio at which a ram-jet engine may be operated.

Another object is to provide apparatus for determining the total temperature ratio of jet engine equipment operating with high temperature exhaust by measuring selected total and static pressures which I have shown to be interrelated so that they may express a function of said ratio and converting said pressures to a resultant movement from which the exhaust gas temperature may be readily determined or from which performance control mechanism may be automatically controlled.

Another object is to provide an apparatus for using static pressures to evaluate both the temperature ratio and exhaust gas temperature.

Another object is to provide an apparatus involving the application of the temperature ratio, Tau, as a parameter for fuel metering and engine control, over all altitude and air speeds at which said engines will operate, said application being independent of the fuel-air ratio and combustion efficiency.

These and other objects will be manifest from a consideration of the present description, appended claims, and drawing in which:

Fig. 1 is a schematic view of a ram jet engine with numbered stations in combination with a mechanical type balancing "Tau-meter" suitable for application to fuel metering control based on the combustion chamber inlet Mach number method of determining Tau.

Fig. 2 is a representative curve illustrating the type of variation obtained from a ram jet engine.

Fig. 3 is a modification of the balancing mechanism of Fig. 1 showing an electrical design "Tau-meter."

Figure 4:
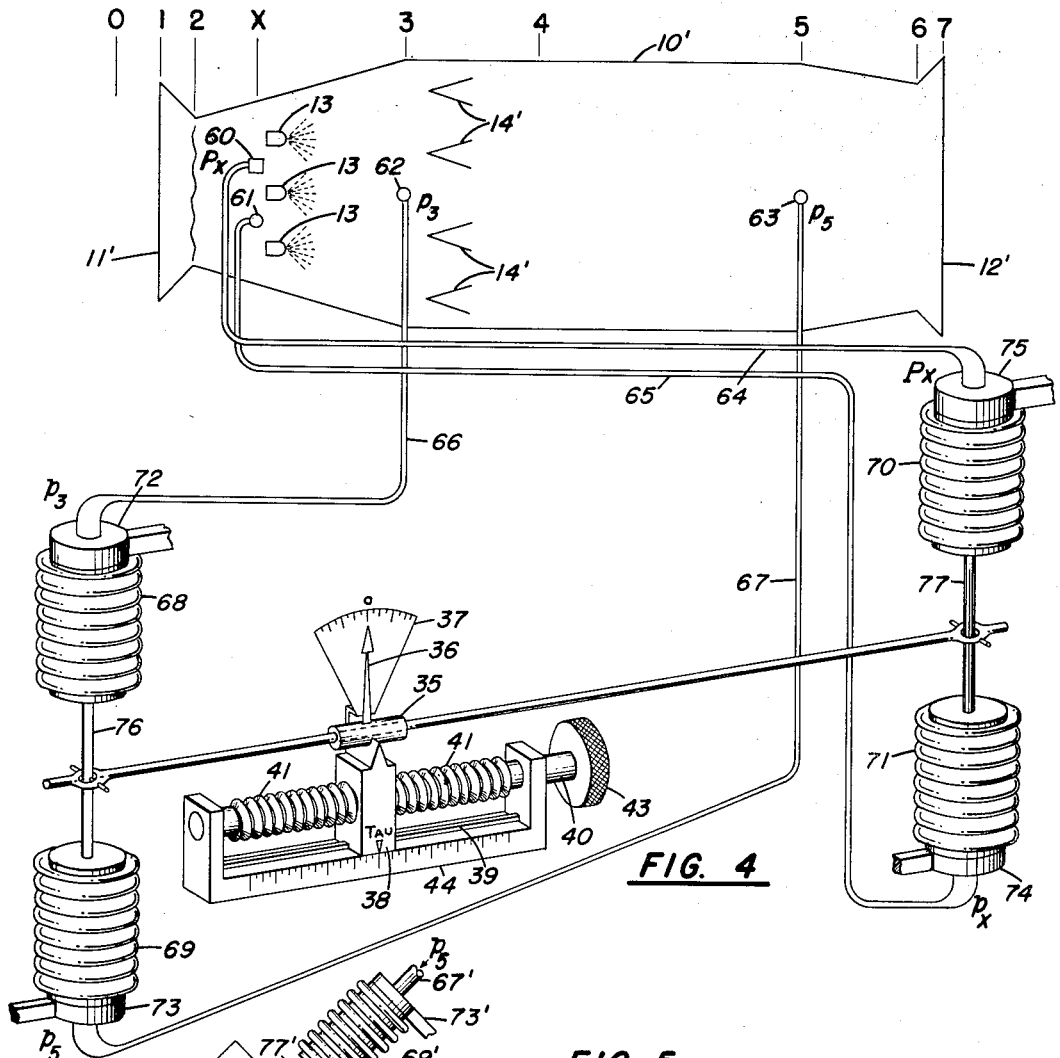
Fig. 4 depicts a schematic view of a jet engine with stations marked in accordance with ram jet or a turbo jet engine with afterburner positions in combination with a mechanical fuel flow meter control based on the combustion chamber static pressure drop method of determining Tau.

Referring to Fig. 1, a ram jet engine 10 is shown. The numerals 0, 1, 2, 3, 4, 5, 6, and 7 indicate the positions of operational stations. One of several general inlet types usually employed is shown schematically at 11. The engine outlet may be shown at 12, or may not include a diverging section and may instead end at 6. The fuel injectors 13 are positioned as shown in the inlet diffuser at some convenient position at or ahead of the flame holders 14 in a usual manner. The station numeral 0 depicts the free air stream position, 1, the supersonic-diffuser air inlet, 2, the supersonic-diffuser throat, 3, the diffuser exit and combustion chamber inlet, 4, a station immediately downstream of the burners, 5, the combustion chamber outlet, 6, the exhaust-nozzle throat, 7, the exhaust nozzle outlet, and X, a station between 2 and 3 but upstream of the point of fuel injection.

The usual prior practice of assuming that Tau, the total temperature ratio, varies only with fuel-air ratio is inaccurate, because variations in combustion efficiency are being ignored.

Diffuser shock position as well as the combustion inlet Mach number are dependent upon Tau, the total temperature ratio across the engine, as well as the exit nozzle throat area.

As mentioned above, Fig. 2 represents a variation obtained with a ram jet engine. This variation may be expressed as $M_3\sqrt{\text{Tau}}$=function of $M_0$, the flight Mach number. As used in this description the letter M represents Mach number, $$\text{Tau} = \frac{T_7}{T_0} = \frac{T_6}{T_3} = \frac{T_5}{T_x}$$

$T$=total temperature in ° F., $P$=total pressure, and small $p$=static pressure. Above $M_0 \approx 1$, the relation can be simplified to $M_3\sqrt{\text{Tau}}$=constant. In the range of combustion chamber inlet velocities usually encountered, $M_3$ can be given with reasonable accuracy by $$K\sqrt{\frac{P_3 - p_3}{p_3}}$$

or by $$K'\sqrt{\frac{P_x - p_x}{p_x}}$$

where K and K' are constants. From the foregoing relationship it can be readily seen that $$\text{Tau} = C\frac{p_3}{P_3 - p_3}$$

where C is a constant.

All values of the functional relationship stated, except the exhaust gas temperature $T_5 = T_6 = T_7$, are easily measurable quantities. The curve of Fig. 2 is different for each engine configuration and can be determined either experimentally or analytically. Once this variation is known Tau can be determined by measuring only $P_3$ and $p_3$ or $P_x$ and $p_x$ where $x$ is a convenient station in the subsonic portion of the inlet diffuser. In either case the exhaust gas temperature, can be indirectly determined from the additional measurement of $T_x$. It is to be noted that neither a knowledge of the altitude of operation is required nor is a knowledge of the air speed at supersonic velocities required.

The relation given by Fig. 2 can also be used to maintain a predetermined combustion chamber inlet Mach number, $M_3$, by suitable variation in Tau. In the practical engine, blowout often occurs above a given $M_3$, and the operating $M_3$ must be held below this critical value.

Diffuser normal shock location of a ram jet engine is a function of the engine back pressure. Back pressure may be controlled by varying the exit nozzle throat area or the value of Tau. Proper variation of the value of Tau can of course be made only if the value of Tau is known. I contemplate evaluating Tau by the method just described and then use the value so determined in controlling engine thrust, $M_3$, and the normal shock position (shown by a wavy line near the engine inlet) as well as in evaluating the exhaust gas temperature. By varying the fuel flow as required the desired value of Tau may be obtained. The fuel flow may be varied manually or automatically.

The use of a mechanical device based upon the supersonic portion of the relation indicated by Fig. 2 and utilizing a series of bellows is illustrated as applied to the ram jet engine of Fig. 1. The bellows are joined for communication with the ram jet 10 through pressure lead line 15 and the total pressure pickup 16, and through the pressure lead lines 18, 19 and static-pressure pickups or static wall orifices 20, 20'. As will be understood these are known procedures for taking individual static and total pressure readings. The lines 15, 17, 18, and bellows 21, 22, 23 may be supported by and secured to fixed members 24, 25 and 26 so as to permit pressure response by the bellows. The bellows 21 and 22 carry disks 28, 29 integral therewith which are fixed to the correlating rod 30. The bellows 23 is joined to the rod 31 by a similar disk 32.

The lever rod 27 is joined to the rods 31, 30 as shown at 33, 34 and passes through pivoted slide 35 carrying indicator arrow 36. A graduated scale 37 is associated with the arrow 36 and the scale 37 is secured to fulcrum block 38 which has a guide 39. The block 38 is mounted on an adjusting member 40 having threads 41 as shown. The member 40 has a knurled handle 43 which is used to rotate it in the graduated stand 44 as illustrated. The fulcrum block 38 is adjustable and for a given engine configuration, when in balance, has only one position for each value of Tau. By calibrating the position of the fulcrum in terms of Tau, the apparatus can be used as a "Tau-meter." If used to obtain a predetermined Tau, the engine conditions may be varied until the desired value of Tau is obtained. Although this device is especially applicable at supersonic flight velocities, it can be calibrated for use at subsonic flight velocities.

The electrical design meter of Fig. 3 may be substituted for the mechanical design meter shown in Fig. 1, the connection to the ram jet engine and the bellows 21', 22', 23' being arranged similarly to the connections and bellows 21, 22, 23. In Fig. 3 the movement of the pressure responsive bellows 21', 22', 23' results in a change in the resistances 46, 47 of the Wheatstone bridge balancing circuit because of the movement of members 48, 49. When used as a "Tau-meter" the adjustable resistance 50 which is calibrated in terms of Tau is varied until the bridge is balanced as shown by zero current flow through the indicator 52.

The resistance 51 is a fixed resistance. When the meter is used in the control system, Tau will be preset on the adjustable resistance 50 and the meter 52 will show the direction and amount of unbalance. The fuel flow can then be adjusted accordingly. The power source is shown at 55.

In practice the metering units of Figs. 1 and 3 are operated in a sealed container (not shown) maintained at a constant internal pressure in order to eliminate the effect of variable ambient pressure on the bellows. No modification of these designs are required for their use in limiting combustion chamber inlet Mach number. An engine performance regulating member such as rod 57 fixed to lever rod 27 as at 56 may be used in connection with engine performance regulating equipment, (not shown).

Figure 5:
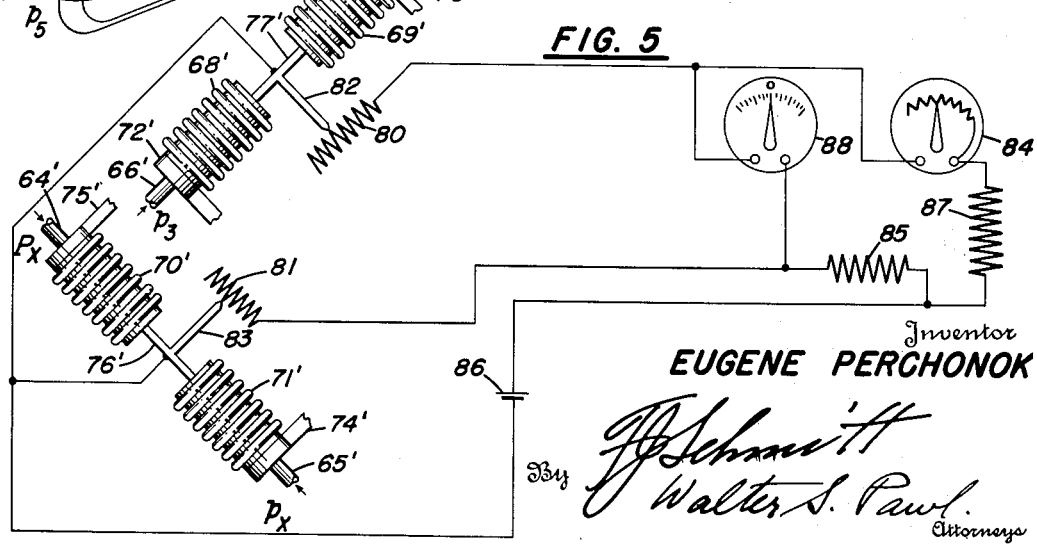
Fig. 5 is a modification of the balancing mechanism of Fig. 4 and depicts an electrical design "Tau-meter."

The operating principles and techniques of the above described designs are the same as those used for the "Tau-meter" designs included in Figs. 4 and 5 which illustrate apparatus suitable for use in the static pressure drop method of determining Tau.

In Fig. 4, 10' depicts a ram jet engine or so much of a turbojet tail pipe burner as directly relates to the invention. The stations 0, 1, 2, 3, 4, 5, 6, 7 and X are as shown in Fig. 1, the same reference numerals being used for convenience. Figs. 4 and 5 show alternate arrangements for the practical applications of the above-mentioned pressure-temperature relation for a constant area ram jet combustion chamber and a turbojet afterburner that is, $$\frac{p_3-p_5}{P_x-p_x}=K\frac{T_5}{T_x}+C$$

The inlet 11', outlet 12', fuel injectors 13 and flame holders 14' are shown positioned to correspond to their equivalents 11, 12, 13, and 14 of Fig. 1.

It will be seen that Fig. 4 differs from Fig. 1 in that four bellows instead of three are necessary in the meter portion. In Fig. 4, total pressure pickup 60, static-pressure pickups or wall orifices 61, and 62, and wall orifice 63 are connected to pressure lead lines 64, 65, 66 and 67 leading to the meter bellows as shown.

The pairs of bellows 68, 69, and 70, 71 are mounted on fixed supports 72, 73 and 75, 74 in the manner described in connection with the pair of bellows 21, 22, Fig. 1. The rods 76 and 77 connect the pairs of bellows 68, 69 and 70, 71. The rods 76 and 77 are joined to the balancing mechanism as described for Fig. 1 and the same numerals are used to avoid duplication of description.

From the above it will be seen that I have provided an arrangement of a ram jet engine or turbojet afterburner in combination with a mechanical design of "Tau-meter" based on the combustion chamber static pressure drop method of determining Tau, and which is suitable for application to fuel-metering control.

An alternate apparatus to Fig. 4 is illustrated in Fig. 5 wherein a schematic diagram of an electrical design using the Wheatstone bridge balancing principle is depicted. The meter of Fig. 5 may be substituted for that of Fig. 4.

In Fig. 5, leads 64', 65', 66', 67', bellows 68', 69', 70', 71', supports 72', 73', 74', 75', and rods 76', 77' correspond to the basic numeral parts, Fig. 4. The movement of the pairs of pressure responsive bellows 68', 69', and 70', 71' results in change in the resistances 80, 81 of the bridge circuit because of the movement of members 82, 83.

When used as a "Tau-meter" the adjustable resistance 84 is varied until the bridge is balanced as shown by indicator 88. The resistance 84 is calibrated in terms of Tau and the value of Tau thus determined. The resistances 85 and 87 are fixed resistances whose values depend upon the engine design and characteristics. When used in a control system, the indicator will show the amount and direction of Tau unbalance. The power source for the meter is shown at 86. As is the case with the meters of Figs. 1, 3 and 4 the unit is operated in a sealed container (not shown) maintained at a constant internal pressure to eliminate the effect of variable ambient pressure on the bellows.

The total and static pressure symbols $P_3$, $p_3$, $P_x$, $p_x$ and $p_5$ are shown on the figures with arrows to facilitate an understanding of the operation. In Figs. 1 and 4 the arrow indicator 36 is adjustable along the rod 27 so as to give a proper reading to facilitate manual control.

It will be noted that the only reading taken in a high temperature zone is at station 5 and that this is accomplished by an easily inserted static wall orifice. Accordingly the invention avoids the use of temperature or total pressure instruments or probes in the high temperature zone as well as greatly facilitates the determination of exhaust gas temperatures by use of indirect methods. Diaphragms or bellows may conveniently be used as pressure responsive devices in the apparatus.

If the final average gas temperature could be directly measured, it would be relatively simple to evaluate the total temperature ratio and then control its actual value by varying the fuel flow. However, temperature stratification combined with the high temperature values desired and achieved by ram-jet engines for high thrust operation preclude simple direct measurement. The present designs provide a simple means of evaluating the total temperature ratio from which the exhaust gas temperature can be obtained, if desired, and also provide the basis for ram-jet fuel-metering controls using the total temperature ratio as the control variable.

The above described methods and apparatus are highly useful for the purposes above described. It is contemplated that additional "Tau-meter" designs using mechanical or electrical devices or a combination of both, actuated by pressures directly or by pressure differences may be provided. It is further contemplated that the information obtained by the present improvements may be used in conjunction with either manual or automatic regulation. Although some current turbo-jet tail-pipe burner designs may not have constant area combustion chambers, the fuel metering control suggested can, by appropriate selection of constants and by suitable calibration, also be applied to them.

The methods described provide a ram, and turbo-jet afterburner performance parameter and as before stated a basis for metering control. It is believed that there is herein provided a more reliable and accurate way of determining Tau by methods which are relatively simple and especially suitable for use in flight.

Also, the methods provide a sound basis for the use of automatic operating fuel metering arrangements in combination with the apparatus illustrated.

The above description is not intended to be limitative but rather is illustrative of the invention. It is desired that the scope of the improvements be as defined by the appended claims and their equivalents.

The invention described herein may be manfactured and used by or for the Government of the United States of America for governmental purposes without the payment of any royalties thereon or therefor.

In the claims:

1. In combination with a jet engine having an air inlet, a diffuser portion, a combustion chamber, and an exhaust gas outlet, first pressure responsive means connected to the engine for providing a response which is proportional to the static pressure in the region of the junction between the diffuser portion and the combustion chamber, second pressure responsive means connected to the engine for producing a response which is proportional to the difference between the total pressure and the static pressure in the region of the junction between the diffuser portion and the combustion chamber, and means operatively connected to and responsive to the action of both said pressure responsive means for obtaining the ratio of the static pressure to the difference between said total pressure and said static pressure, said ratio being proportional to the ratio of the absolute temperature of the exhaust gases to the absolute temperature of the inlet gas.

2. In combination with a jet engine having an air inlet, a combustion chamber, and an exhaust gas outlet, a device for determining the ratio of the absolute temperature of the exhaust gases to the absolute temperature of the inlet gases, said device comprising first pressure responsive means connected to the engine for producing a response which is proportional to the static pressure in the area of the junction between the air inlet and combustion chamber, second pressure responsive means connected to the engine for producing a response which is proportional to the difference between the total pressure and the static pressure in the area of the junction between the air inlet and combustion chamber, means operatively connected to and responsive to the action of both said pressure responsive means for combining said responses to obtain a value which is proportional to the ratio of the static pressure to the difference between the total and static pressure, said value being proportional to the ratio of the absolute temperature of the exhaust gases to the absolute temperature of the inlet gases.

3. In combination with a jet engine having an air inlet, a combustion chamber, and an exhaust gas outlet, a device for determining the ratio of the absolute temperature of the exhaust gases to the absolute temperature of the inlet gases, said device comprising static pressure pickup means and total pressure pickup means positioned in the vicinity of the junction of the air inlet and the combustion chamber, a first pressure responsive device which provides a mechanical movement which is proportional to the static pressure, connections from the static pressure pickup means to said first pressure responsive device, a second pressure responsive device which provides a mechanical movement which is proportional to the difference between the total pressure and the static pressure, connections from the static pressure pickup means and the total pressure pickup means to said second pressure responsive device, and means operatively connected to and responsive to the action of both said pressure responsive devices for combining said mechanical movements to give a response which is proportional to the ratio of the static pressure to the difference between the total pressure and the static pressure, said last mentioned response being equal to the ratio of the absolute temperature of the exhaust gases to the temperature of the inlet gases.

4. In combination with a jet engine having an air inlet, a combustion chamber, and an exhaust gas outlet, a device for determining Tau, the ratio of the absolute temperature of the exhaust gases to the absolute temperature of the inlet gases, said device comprising a plurality of static pressure pickup means positioned in the engine at the junction of the air inlet and the combustion chamber, a total pressure pickup means positioned in the engine at the junction of the air inlet and the combustion chamber, a first slider arm, means including pressure responsive means operatively connecting said first slider arm to said static pressure pickup means to provide a mechanical movement which is proportional to the static pressure, a second slider arm, means including pressure responsive means operatively connecting said second slider arm to said total and static pressure means to provide a mechanical movement which is proportional to the difference between the total and static pressures, each of said slider arms coacting with a variable resistance, each of said resistances forming a leg of a Wheatstone bridge, a third leg of the Wheatstone bridge comprising a variable resistance calibrated in terms of Tau, and a fourth leg of the Wheatstone bridge comprising a fixed resistance which is proportional to the constants of the jet engine, whereby, when the Wheatstone bridge is balanced by adjusting the third leg of the Wheatstone bridge the resistance which is calibrated in terms of Tau indicates the ratio of the absolute temperature of the gases at exhaust to the absolute temperature at inlet to the engine.

References Cited in the file of this patent

UNITED STATES PATENTS

| | | |
|---|---|---|
| 1,050,332 | Billings | Jan. 14, 1913 |
| 1,449,437 | Obermaier | Mar. 27, 1923 |
| 2,190,506 | Wurr | Feb. 13, 1940 |
| 2,549,621 | Moore, Jr. | Apr. 17, 1951 |
| 2,549,624 | Moore, Jr. | Apr. 17, 1951 |
| 2,592,385 | Borden | Apr. 8, 1952 |
| 2,641,105 | Drake | June 9, 1953 |

FOREIGN PATENTS

| | | |
|---|---|---|
| 504,285 | Great Britain | Nov. 21, 1938 |

OTHER REFERENCES

Ziebolz: "Analysis and Design of Translator Changes," Askania Regulator Co., Chicago, Illinois, 1946 (vol. I, pp. 180–181, 201, 209, 210; vol. II, page including Fig. 300 and page including Fig. 311, pages not numbered).

Ziebolz: "Relay Devices," etc., Askania Regulator Co., Chicago, Ill., 1940 (vol. I, p. 36; vol. II, pp. 25 and 26).

Report No. 896, Thirty-fourth Annual Report of the National Advisory Committee for Aeronautics. 1948. Pages 99–105.